Patented Oct. 7, 1952

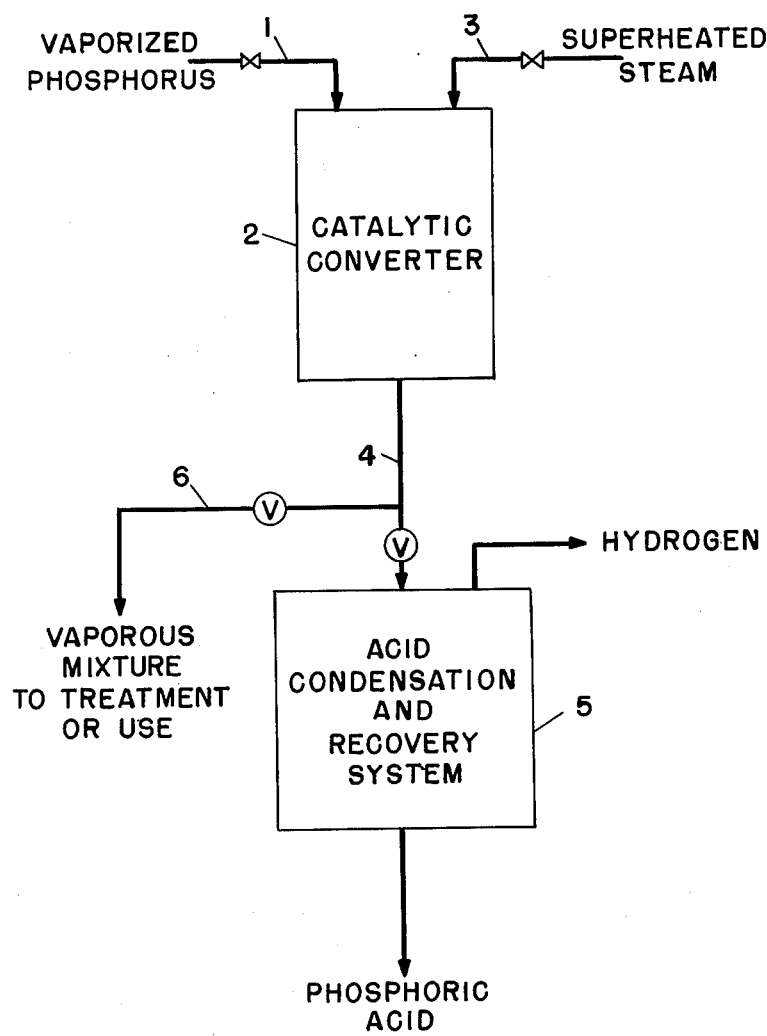

2,613,135

UNITED STATES PATENT OFFICE 2,613,135

OXIDATION OF PHOSPHORUS WITH STEAM

John F. Shultz, Pittsburgh, Pa., assignor to Tennessee Valley Authority, a corporation of the United States Application September 28, 1950, Serial No. 187,337

7 Claims. (Cl. 23—165)

(Granted under the act of March 3, 1883, as amended April 30, 1928; 370 O. G. 757)

The invention herein described may be manufactured and used by or for the Government for governmental purposes without payment to me of any royalty thereon.

This invention relates to improved catalytic methods for the oxidation of phosphorus with steam. This application is a continuation-in-part of my pending application Serial No. 56,241, filed October 23, 1948, now abandoned.

The oxidation of phosphorus with steam to produce phosphoric acid and hydrogen has been studied by a number of investigators. Various conditions of pressure and temperature, and a number of catalysts, have been suggested. The processes which have been proposed fall into two general classes. In the first of these, the reaction is carried out in liquid phase under pressure and at relatively low temperatures, as is shown by U. S. Patent 1,848,295, Ipatiew. In the second class, phosphorus is reacted with steam in gas phase at relatively low pressure and at relatively high temperatures, as is shown by U. S. Patent 1,605,960, Liljenroth and Larsson.

The first class, as typified by Ipatiew, has the advantage that relatively low temperature is used and that the hydrogen is generated under pressure. This type operation, however, has a number of disadvantages which tend to nullify the advantages and makes the process unsuitable for commercial use. In operations of this type, the reactant must be pumped in the form of an emulsion into the reaction chamber against high pressure, an operation which involves many difficulties. The proportion of water required to give a stable emulsion results in the production of weak phosphoric acid, frequently as low as 50 per cent $H_3PO_4$, which is too dilute for many purposes. And, finally, operation in liquid phase results in very severe corrosion of equipment and in conversion of part of the reacting white phosphorus to the solid red form, which causes plugging of pumps and nozzles.

Operation of the liquid-phase process apparently has never been attempted on a commercial scale. The many difficulties inherent in the process have caused attention to be turned to the gas-phase method. The latter, as is shown by Liljenroth, is carried out at about 1000° C. without a catalyst, or at temperatures as low as 700° C. in the presence of catalysts. Catalysts for this reaction which have been mentioned in patents are the non-alkaline metals of the first group of the periodic system; all the metals of the sixth to eighth groups, and their phosphides; metallic orthophosphates; ferric oxides; ferrosilicon; various silicates; activated carbon; and others.

Attempts have been made to operate the gas-phase process on a commercial or semicommercial scale, both in this country and in Europe. Apparently these attempts were unsuccessful, since no commercial plant is in operation at present, so far as is now known. The results of work reported by Britzke and Pestov (Trans. Sci. Inst. Fert. (Moscow) 59, pp. 5–160, 1929) indicate that the trouble has been both incompleteness of reaction and contamination of the desired product by side products of the phosphorus-steam reaction. The principal contaminants in the product are phosphine in the hydrogen produced and phosphorous acid in the phosphoric acid. Phosphine is very undesirable if the hydrogen is to be used in ammonia synthesis, because phosphine is a poison to ammonia synthesis catalysts. Phosphine is also highly poisonous to workmen who may be exposed to its fumes.

Apparently no prior investigators have been successful in developing a practical catalyst for the phosphorus-steam reaction, or a catalytic method that has all the necessary requirements for a commercial process. To be practical commercially, a catalyst for this process must not only give substantially complete oxidation of the phosphorus but must also have physical stability to give long catalyst life without loss of activity and must have chemical stability to prevent loss of catalyst from the reaction zone.

The vapor-phase oxidation of phosphorus with steam was attempted at the Tennessee Valley Authority's plant at Muscle Shoals. A number of catalysts shown in the prior art were tested as to their efficiency in this reaction. It was found that silver metal, as disclosed by Liljenroth in U. S. Patent 1,605,960, had high initial catalytic activity, but that it was attacked by the reaction products and was rapidly removed from the reaction chamber. This same disadvantage was found to occur when copper or platinum was used. Copper silicate was tested and was found to have high catalytic activity, but was also found to disintegrate rapidly in the reaction chamber. Cobalt phosphide was tested and was found to be lacking in sufficient catalytic activity to cause complete oxidation of phosphorus.

None of these catalysts were found completely satisfactory for commercial use.

It is an object of this invention to provide a method for a vapor-phase oxidation of phosphorus with steam which is adapted to commercial use.

Another object is to provide such a method which yields as product a complex vaporous mixture in which substantially all phosphorus is in pentavalent and trivalent states.

Another object is to provide a catalytic method for the oxidation of phosphorus with steam in which the catalyst is not removed from the reaction zone at a rate so great as to make operation impractical.

Other objects and features of novelty will be either specifically pointed out or will become apparent upon reference to the following description, claims, and drawings which describe and show an illustrative embodiment of this invention.

I have now found that commercially practical catalysts may be obtained by supporting a material selected from the group consisting of copper, platinum, their phosphides, and mixtures thereof, on a material selected from the group consisting of pyrophosphates of titanium and zirconium.

I have found that a mixture of phosphorus vapor and steam in such proportions that the mol ratio of water to phosphorus is in the range from about 16:1 to 35:1 passed over such catalyst at a temperature in the range from about 600° to 900° C. at a rate of flow in the range from about 500 to 7500 volumes per volume of catalyst per hour yields a vaporous mixture in which substantially all phosphorus is oxidized into pentavalent and trivalent states. I have also found that operation in this manner and with these catalysts does not result in removal of the catalyst from the reaction zone at rates so high as to make such operation impractical.

The accompanying drawing is a schematic diagram illustrating a process embodying my invention.

With reference thereto, vaporized phosphorus from a suitable source (not shown) enters via line 1 and is led to catalytic converter 2. An inert carrier gas may be admixed with this vaporized phosphorus if desired. Water vapor, preferably in the form of superheated steam from any suitable source (not shown) is led into the system via line 3. Line 3 may be arranged to connect with line 1 outside converter 2, if desired, or may enter converter 2 directly as is illustrated, since for operation of my process it is necessary merely to commingle the vapors of phosphorus and water in a manner to secure a fairly homogeneous mixture. The rate of introduction of vapor is controlled so that the ratio of water vapor to phosphorus vapor in the resulting mixture is in the range from about 16:1 to 35:1, or preferably in the range from about 20:1 to 25:1.

The mixture of vapors in converter 2 then is passed over and in intimate contact with a catalyst comprising a material selected from the group consisting of copper, platinum, their phosphides, and mixtures thereof, supported on a material selected from the group consisting of pyrophosphates of zirconium and titanium. A method of preparing such catalyst is described subsequently herein.

The degree of pressure maintained in converter 2 is not very critical, but low pressures or substantially atmospheric pressure is preferred because equipment for such pressures can be constructed more cheaply. The temperature of catalyst and reactant in converter 2 may be maintained in the range from about 600° to 900° C. The reaction occurs over this entire temperature range, but with many arrangements of beds of catalyst there is likely to be some accumulation of liquid acids of phosphorus on the catalyst when temperatures below 650° C. are used. I prefer to operate in the temperature range from about 650° to 900° C. in order to avoid any possibility of accumulation of liquid acid on the catalyst, and, for economy in operation, I prefer to operate in the range from about 650° to 700° C.

The mixture of vapors is passed over the catalyst at a rate of flow in the range from about 500 to 7500 volumes per volume of catalyst per hour. I have found that the phosphorous acid content of the phosphoric acid produced increases somewhat with the rate of flow. Therefore, I prefer to operate at rates of flow in the range from about 500 to 2000 volumes of vapor per volume of catalyst per hour when it is desired to produce phosphoric acid containing minimum amounts of phosphorous acid. In this range the phosphorous acid content of the phosphoric acid produced will be minimized.

Reaction products are withdrawn from converter 2 via valved line 4 and are led to an acid condensation and recovery system 5. Here the products are cooled and partially condensed and are separated by the use of suitable conventional methods and apparatus for separating condensable vapors from noncondensable gases. This results in a liquid fraction of phosphoric acid, containing definite quantities of phosphorous acid, and a noncondensable gaseous fraction of hydrogen, containing small amounts of phosphine. These are withdrawn to storage or use as desired. Alternatively, the mixture of reaction products may be withdrawn via valved line 6 to further treatment or use as desired.

The catalyst of my invention may be prepared by heating an oxide or suitable salt of titanium or zirconium with phosphoric acid in excess of the stoichiometrical amount required for the formation of the corresponding pyrophosphates at about 900° C. The excess acid is necessary in order to avoid the formation of any orthophosphate, which turns to powder and is therefore unsuitable as a catalyst support. These pyrophosphates are hard, nonhygroscopic solids and have small catalytic effect in themselves. Any other methods of forming the pyrophosphates may be used if desired.

The pyrophosphates may then be soaked in a solution of an easily decomposable compound of copper or platinum, such as copper nitrate or chloroplatinic acid. The pyrophosphate then is dried and the copper or platinum compound is decomposed by any suitable method, such as heating or reduction in a stream of hydrogen. The completed catalyst may be used in the form of a metal supported on the pyrophosphates, or, if desired it may be phosphided by exposing the catalyst comprising the reduced metal supported on pyrophosphates to vapors of phosphorus at high temperature. The exact method of preparing the catalyst is not critical. Any of the known methods of depositing a metal on catalytic supports may be used.

I have found that copper and platinum and their phosphides are retained very tenaciously by the pyrophosphates of titanium or zirconium, so that they are not dissolved and removed from the reaction zone by these products of this reaction to anything like the extent to which the metals themselves are removed when used in massive form or when used on other supports. This loss of metal from the converter is so greatly reduced that the process becomes commercially practical. This property of retention of these metals on these supports is so great that a co-worker found it was quite practical to regenerate the catalysts, when after a long period of use they became weakened by loss of metal, merely by placing a few blocks of the metal in the stream of reaction mixture at or near the entrance to the catalyst bed. The metal is rapidly taken up from such blocks into the reaction mixture and is carried into the catalyst bed where it is adsorbed onto such supports and results in regeneration of the catalysts.

The following examples illustrate the advantages gained by the use of some of my catalysts and methods as compared to other catalysts for this reaction.

Example I

Phosphorus vapor for introduction into the reaction chamber was generated in a saturator maintained at a constant temperature in a molten wax bath. A carrier gas was passed through the saturator at a measured rate, where it picked up phosphorus vapor and carried it through the heated connecting tubes into the reaction chamber. Steam was generated by heating water in an electrically heated boiler in which steam in an outer jacket maintained the water in the inner compartment of the boiler at the boiling point. Electrical energy was supplied to a heating coil in the inner boiler to convert water at its boiling point into steam. The amount of steam produced was calculated on the basis of the electrical energy supplied to the heating coil.

The phosphorus-steam mixture was passed through a tube filled with catalyst heated to the desired temperature. The reaction products were passed first through a refrigerated trap to collect the acid and any unconverted phosphorus, and then through an analysis train to determine the amounts of hydrogen and phosphine.

A catalyst was prepared by soaking pumice in copper nitrate solution and heating the product. The resulting copper oxide was reduced by heating in hydrogen at 450° C. A test with this catalyst under the conditions described above gave the following results.

| Temperature, °C. | Space velocity [1] | $H_2O:P_4$ mole ratio | $P_4$ oxidized to pentavalent and trivalent states, percent | Number of runs, average |
|---|---|---|---|---|
| 675 | 500 | 15:1 | 84.9 | 3 |
| 675 | 500 | 22:1 | 94.4 | 8 |
| 700 | 500 | 15:1 | 96.1 | 2 |

[1] Volume of reactant mixture per volume of catalyst per hour.

The phosphorus oxidation was not sufficiently complete in these tests and, in addition, the copper was rapidly removed from the reaction zone by the reaction products. The proportion of phosphorus oxidized by this catalyst of the prior art may be compared with that obtained in my novel process, used in the following example.

Example II

Zirconium pyrophosphate was prepared by heating zirconium oxide with excess phosphoric acid (over that required to form pyrophosphate) at 900° C. This was treated with copper nitrate as described above to give a supported catalyst containing only 0.5 per cent copper. Operating as described in Example I, the following results were obtained with this catalyst.

| Temperature, °C. | Space velocity | $H_2O:P_4$ mole ratio | $P_4$ oxidized to pentavalent and trivalent states, percent |
|---|---|---|---|
| 700 | 500 | 25.8:1 | 99.9 |
| 700 | 1,000 | 28.0:1 | 99.3 |
| 800 | 500 | 24.1:1 | 99.5 |
| 700 | 500 | 29.1:1 | 99.7 |

Not only was the oxidation practically complete, but the catalyst showed no physical deterioration over a long series of tests. The rate of copper loss was very low as compared to catalysts supported on other materials or to catalysts of the unsupported type.

Example III

A catalyst was prepared by soaking aluminum silicate gel in chloroplatinic acid solution, drying at 100° C., heating at 580° C. to decompose the chloroplatinic acid, and phosphiding the platinum by treatment with red phosphorus. This catalyst was not very effective as is shown by the following results.

| Temperature, °C. | Space velocity | $H_2O:P_4$ mole ratio | $P_4$ oxidized to pentavalent and trivalent states, percent |
|---|---|---|---|
| 900 | 500 | 22:1 | 96.6 |
| 800 | 500 | 22:1 | 88.6 |
| 700 | 500 | 22:1 | 39.5 |

The catalyst disintegrated during the tests and was removed from the reaction zone. These results may be compared with those obtained by the use of my method, in the following example.

Example IV

Titanium pyrophosphate was prepared by heating titanium oxide with excess phosphoric acid at 900° C. The resulting hard, porous solid was broken into pieces and was screened to separate a fraction passing a standard 7-mesh screen and retained on a 12-mesh screen. This fraction was then repeatedly soaked in copper nitrate solution, dried, and the copper nitrate decomposed by heating in a stream of hydrogen to give a catalyst containing about 14 per cent of copper, supported on the titanium pyrophosphate. The following results were obtained using this catalyst.

| Temperature, °C. | Space velocity | $H_2O:P_4$ mole ratio | $P_4$ oxidized to pentavalent and trivalent states, percent |
|---|---|---|---|
| 700 | 500 | 23.6:1 | 99.5 |
| 700 | 500 | 29.7:1 | 99.2 |
| 700 | 500 | 35.1:1 | 98.5 |
| 700 | 500 | 37.3:1 | 97.8 |

There was some loss of copper from this catalyst in the reaction zone, but not nearly so much as was experienced with massive copper and copper supported on other supports.

It was noted that the results obtained using a small amount of copper, as in Example II, were almost as good as the results obtained using 14 per cent of copper in Example IV. Apparently, the small quantity of copper in contact with the surface of my novel catalyst support is retained so tenaciously that it is as effective as larger quantities which, by building up a certain thickness of copper on the surface of the catalyst, act more like massive copper.

*Example V*

Similar experiments have shown that platinum and platinum phosphide similarly supported have catalytic activity equal or superior to that of copper on the same supporting materials. Such catalysts under the conditions given above give a very high degree of oxidation of phosphorus. In addition, platinum and platinum phosphide are removed from the reaction zone by the reaction products at a rate which is considerably slower than that at which copper is removed. However, the high initial and replacement costs of catalysts comprising platinum or platinum phosphide supported on titanium or zirconium pyrophosphates as compared to the cost of copper supported on the same materials are such as to make the copper catalysts described above more economical for most commercial uses.

I claim as my invention:

1. A process for the oxidation of phosphorus with steam which comprises mixing superheated steam and phosphorus vapor in proportions in the range from about 16:1 to 35:1; passing the resulting mixture of vapors over and in intimate contact with a catalyst comprising a material selected from the group consisting of copper, platinum, their phosphides, and mixtures thereof supported on a material selected from the group consisting of pyrophosphates of titanium and zirconium in a reaction zone; maintaining the temperature of the catalyst and vapors in contact therewith in the range from about 600° to 900° C.; maintaining the rate of flow of said vapors over said catalyst in the range from about 500 to 7500 volumes of vapor per volume of catalyst per hour; and withdrawing a vaporous mixture of reaction products, in which substantially all phosphorus is present in pentavalent and trivalent states, from said reaction zone.

2. A process for the oxidation of phosphorus with steam which comprises mixing superheated steam and phosphorus vapor in proportions in the range from about 16:1 to 35:1; passing the resulting mixture of vapors over and in intimate contact with a catalyst comprising a material selected from the group consisting of copper, platinum, their phosphides, and mixtures thereof supported on a material selected from the group consisting of pyrophosphates of titanium and zirconium in a reaction zone; maintaining the temperature of the catalyst and vapors in contact therewith in the range from about 650° to 900° C.; maintaining the rate of flow of said vapors over said catalyst in the range from about 500 to 7500 volumes of vapor per volume of catalyst per hour; and withdrawing a vaporous mixture of reaction products, in which substantially all phosphorus is present in pentavalent and trivalent states, from said reaction zone.

3. A process for the oxidation of phosphorus with steam which comprises mixing superheated steam and phosphorus vapor in proportions in the range from about 16:1 to 35:1; passing the resulting mixture of vapors over and in intimate contact with a catalyst comprising a material selected from the group consisting of copper, platinum, their phosphides, and mixtures thereof supported on a material selected from the group consisting of pyrophosphates of titanium and zirconium in a reaction zone; maintaining the temperature of the catalyst and vapors in contact therewith in the range from about 650° to 900° C.; maintaining the rate of flow of said vapors over said catalyst in the range from about 500 to 2000 volumes of vapor per volume of catalyst per hour; and withdrawing a vaporous mixture of reaction products, in which substantially all phosphorus is present in pentavalent and trivalent states, from said reaction zone.

4. A process for the oxidation of phosphorus with steam which comprises mixing superheated steam and phosphorus vapor in proportions in the range from about 20:1 to 25:1; passing the resulting mixture of vapors over and in intimate contact with a catalyst comprising a material selected from the group consisting of copper, platinum, their phosphides, and mixtures thereof supported on a material selected from the group consisting of pyrophosphates of titanium and zirconium in a reaction zone; maintaining the temperature of the catalyst and vapors in contact therewith in the range from about 650° to 700° C.; maintaining the rate of flow of said vapors over said catalyst in the range from about 500 to 2000 volumes of vapor per volume of catalyst per hour; and withdrawing a vaporous mixture of reaction products, in which substantially all phosphorus is present in pentavalent and trivalent states, from said reaction zone.

5. A process for the oxidation of phosphorus with steam which comprises mixing superheated steam and phosphorus vapor in proportions in the range from about 16:1 to 35:1; passing the resulting mixture of vapors over and in intimate contact with a catalyst comprising a material selected from the group consisting of copper, platinum, their phosphides, and mixtures thereof supported on zirconium pyrophosphate in a reaction zone; maintaining the temperature of the catalyst and vapors in contact therewith in the range from about 600° to 900° C.; maintaining the rate of flow of said vapors over said catalyst in the range from about 500 to 7500 volumes of vapor per volume of catalyst per hour; and withdrawing a vaporous mixture of reaction products, in which substantially all phosphorus is present in pentavalent and trivalent states, from said reaction zone.

6. A process for the production of phosphoric acid and hydrogen which comprises mixing superheated steam and phosphorus vapor in proportions in the range from about 16:1 to 35:1; passing the resulting mixture of vapors over and in intimate contact with a catalyst comprising copper supported on zirconium pyrophosphate in a reaction zone; maintaining the temperature of the catalyst and vapors in contact therewith in the range from about 650° to 900° C.; maintaining the rate of flow of said vapors over said catalyst in the range from about 500 to 2000 volumes of vapor per volume of catalyst per hour; and withdrawing a vaporous mixture of reaction products, in which substantially all phosphorus is present in pentavalent and trivalent states, from said reaction zone, 7. A process for the production of phosphoric acid and hydrogen which comprises mixing superheated steam and phosphorus vapor in proportions in the range from about 16:1 to 35:1; passing the resulting mixture of vapors over and in intimate contact with a catalyst comprising copper supported on zirconium pyrophosphate in a reaction zone; maintaining the temperature of the catalyst and vapors in contact therewith in the range from about 600° to 900° C.; maintaining the rate of flow of said vapors over said catalyst in the range from about 500 to 7500 volumes of vapor per volume of catalyst per hour; withdrawing a vaporous mixture of reaction products, in which substantially all phosphorus is present in pentavalent and trivalent states, from said reaction zone; and cooling and partially condensing said mixture and separating a resulting liquid phase composed essentially of phosphoric acid containing a minor proportion of phosphorous acid from a gaseous phase composed essentially of hydrogen containing a minor proportion of phosphine.

JOHN F. SHULTZ.

REFERENCES CITED

The following references are of record in the file of this patent:

UNITED STATES PATENTS

| Number | Name | Date |
| --- | --- | --- |
| 1,605,960 | Liljenroth | Nov. 9, 1926 |
| 1,673,691 | Liljenroth | June 12, 1928 |
| 1,807,790 | Liljenroth | June 2, 1931 |
| 1,882,712 | Andrussow | Oct. 18, 1932 |
| 2,367,877 | Layng | Jan. 23, 1945 |